US005643624A

United States Patent [19]
Aldcroft et al.

[11] Patent Number: 5,643,624
[45] Date of Patent: Jul. 1, 1997

[54] AMORPHOUS SILICAS

[75] Inventors: Derek Aldcroft, South Wirrol; John Robert Newton; Peter William Stanier, both of Cheshire, all of England

[73] Assignee: Unilever Patent Holdings BV, Rotterdam, Netherlands

[21] Appl. No.: 563,748

[22] Filed: Nov. 29, 1995

Related U.S. Application Data

[63] Continuation of Ser. No. 860,568, Mar. 30, 1992, abandoned, which is a continuation of Ser. No. 678,070, Apr. 1, 1991, abandoned, which is a continuation of Ser. No. 535,133, Jun. 8, 1990, abandoned, which is a continuation of Ser. No. 175,336, Mar. 30, 1988, abandoned.

[30] Foreign Application Priority Data

Mar. 30, 1987 [GB] United Kingdom .................. 8707526

[51] Int. Cl.$^6$ ....................................... A23L 2/00
[52] U.S. Cl. ...................... 426/330.4; 426/423; 423/339; 423/335
[58] Field of Search .................... 423/339, 335; 502/407, 233; 420/330.4, 423

[56] References Cited

U.S. PATENT DOCUMENTS

| | | | |
|---|---|---|---|
| 2,940,830 | 6/1960 | Thornhill | 423/339 |
| 3,672,833 | 6/1972 | Telchner et al. | 423/338 |
| 3,959,174 | 5/1976 | Winyall et al. | 423/338 |
| 4,230,679 | 10/1980 | Mahler et al. | 423/338 |
| 4,264,564 | 4/1981 | Friedmann et al. | 423/338 |
| 4,301,034 | 11/1981 | McDaniel | 423/338 |
| 4,629,588 | 12/1986 | Welsh et al. | 423/239 |
| 4,707,504 | 11/1987 | Walkowiak et al. | 523/109 |

FOREIGN PATENT DOCUMENTS

| | | | |
|---|---|---|---|
| 185182 | 1/1985 | European Pat. Off. | |
| 235352 | 9/1987 | European Pat. Off. | |
| 2471949 | 6/1981 | France | 423/338 |
| 561750 | 6/1944 | United Kingdom | 423/339 |

*Primary Examiner*—Melissa Bonner
*Attorney, Agent, or Firm*—Cushman Darby & Cushman IP Group Pillsbury Madison & Sutro LLP

[57] ABSTRACT

An amorphous silica has a pore volume in the range of from about 1.6 to about 2.5 cc g$^{-1}$, a mean pore diameter in the range of from about 8.0 to about 20 nm, a surface area in the range from about 450 to about 1100 m$^2$g$^{-1}$ and an oil absorption in the range of from about 250 to about 350 cc/100g.

1 Claim, No Drawings

AMORPHOUS SILICAS

This is a continuation of application Ser. No. 07/860,568, filed on Mar. 30, 1992, now abandoned, which was abandoned upon the filing hereof which is a continuation of Ser. No. 07/678,070, filed Apr. 1, 1991, now abandoned; which is a continuation of Ser. No. 07/535,133, filed Jun. 8, 1990, now abandoned; which is a continuation of Ser. No. 07/175,336, filed Mar. 30, 1988, now abandoned.

FIELD OF THE INVENTION

This invention relates to synthetic amorphous silicas and their use in the treatment of beers and other alcoholic fermented beverages to stabilise the beverage properties during storage.

BACKGROUND TO THE INVENTION

Alcoholic fermented beverages, for example beers, have a tendency to produce haze during storage and a number of products and processes are known for the removal of haze forming constituents. The haze or turbidity in beer is removable by filtration but a further haze or turbidity can develop on storage. This haze would therefore become apparent only at the stage when the beverage is being prepared for consumption when removal would not be possible. It is therefore desirable to remove during production both the haze developed during the fermentation processes or on standing prior to final processing together with the haze precursors which may develop haze during storage. Materials used for treating the beverage must not remove the components which are essential to the character i.e. body and flavour, of the beer or the head forming components and colouring.

It is believed the haze originates from the presence of certain proteins and any treatment must be selective in removing only those protein species which are responsible for haze formation while leaving other beneficial protein species as constituents of the product sold.

Although the present invention is directed to the treatment of beers, which term includes ales, lagers and stouts, it is applicable to other fermented liquids which are liable to generate haze on storage. Various materials such as bentonites, active carbon, polyvinyl pyrrolidone and silicas have previously been proposed for this purpose and are used commercially, but silicas are preferred because they are more selective in removing the protein species responsible for haze formation without impairing the desired properties of the beverage.

GENERAL DESCRIPTION OF THE INVENTION

The invention provides novel synthetic amorphous silicas defined by reference to their pore volume, mean pore diameter and surface area and their use in the treatment of fermented beverages to remove haze and haze precursors. The amorphous silicas have a pore volume in the range from about 1.6 to about 2.5 $ccg^{-1}$, a mean pore diameter in the range from about 8.0 nm to about 20 nm, preferably up to 14.0 nm preferably to 18 nm, and a surface area from at least about 450 $m^2g^{-1}$, preferably from at least 550 $m^2g^{-1}$, up to about 1100 $m^2g^{-1}$, preferably up to 900 $m^2g^{-1}$. Preferably the amorphous silica is a precipitated silica.

These amorphous silicas have remarkably high structure (high pore volume) for the surface area range defined. As a consequence the silicas have high structural bound water of at least 5% w/w. The combination of high values for these two parameters provide the amorphous silicas with pore size distributions which have a mean pore diameter in the range usually associated with beer stabilising silica of 4.0 nm to 20 nm.

A preferred feature of the amorphous silicas of the invention is an oil absorption in the range from about 250 to about 350 cc/100 g.

There are, in a number of countries, restrictions on the amount of soluble material, in particular iron containing materials, which can be present in any material used in the preparation of beers. Therefore the amorphous silicas of the invention will preferably contain less than about 20 ppm of beer soluble iron, wherein this represents less than about 30% of the total iron present, preferably less than about 10%. A preferred processing feature of the invention is the reduction in beer soluble iron content by contacting the silica at a pH from 2 to 7 with an aqueous solution of an appropriate complexing agent which is capable of forming a complex with iron and has a pK of at least about 12, at a mole ratio of complexing agent to iron of from about 1:1, preferably from about 3:1, with subsequent separation and washing of the silica. Examples are the tetrasodium salt of ethylene diamine tetraacetic acid (designated EDTA), nitrilotri-acetic acid (NTA) and the trisodium salt of N-hydroxyethyl ethylene diamine tri-acetic acid (HEEDTA). These complexing agents have pKs of 25.1, 15.9 and 19.8 respectively. The iron complex may be removed in the washing stage of the preparation.

The average particle size of the silicas is desirably in the range from about 5 to about 30 microns, preferably 15–25 microns. Although particles below about 5 micron provide desired beer clarification properties such relatively small sized material can cause beer filtration problems. Silicas over the average particle size of about 30 micron are suitable for stabilising the beer but the larger particle sized materials need longer time in contact with the beer to be effective. The free moisture content of the silicas is generally less than about 25% w/w, preferably less than about 15% w/w and these provide optimum cost effectiveness in the treatment of beers and other alcoholic beverages.

In general the above defined silicas will be used at a level of not more than 1 g of silica per liter of beer to be treated.

A suitable method of preparing the amorphous silicas of the invention is by reaction of sodium silicate having a $SiO_2:Na_2O$ ratio in the range from about 2.8 to about 3.5:1, with mineral acid, the concentration and volume of the reactants being controlled to give a reaction in the pH range from about 10 to about 10.5, in the presence of a water soluble electrolyte comprising a cation selected from the group comprising sodium and potassium with an associated anion selected from the group comprising bromide, chloride and nitrate, wherein the electrolyte-silica weight ratio is from about 0.10 to 1 to about 0.25 to 1, the precipitation reaction being performed in the temperature range from about 20° C. to about 50° C. and the silicas separated from the reaction medium.

Prior Disclosures

The background to the requirement to treat fermented beverages is given in MBA Technical Quarterly 16 (1979) no.2 pages 90 to 100. In this article J. S. Hough and A. L. Lovell describe the utilisation of silica hydrogels in the treatment of beers. The use of silica xerogels is disclosed in GB 981715 (Brauerie Industries), GB 1279250 (Unilever) and EP 0105633 (Unilever). The use of hydrogels is described in GB 1215928 (Unilever).

Standard Procedures

The silicas of the invention are defined in terms of their physical and chemical properties. The standard test methods used to determine these properties are:

i) Surface Area:

Surface area is determined by standard nitrogen adsorption methods of Brunauer, Emmett and Teller (BET) using a single point method with a Sorpty 1750 apparatus supplied by Carlo Erba company of Italy. The sample was outgassed under vacuum at 270° C. for 1 hour before measurement.

ii) Oil Absorption:

The oil absorption is determined by the ASTM spatula rub-out method (American Society of Test Material Standards D, 281).

The test is based upon the principle of mixing linseed oil with a silica by rubbing with a spatula on a smooth surface until a stiff putty-like paste is formed which will not break or separate when it is cut with the spatula. The volume of oil used is then put into the following equation:

$$\text{Oil absorption} = \frac{\text{cm}^3 \text{ oil absorption} \times 100}{\text{wt of silica sample in gms}}$$

$$= \text{cm}^3 \text{ oil}/100 \text{ g silica}$$

iii) Weight Mean Particle Size:

The weight mean particle size of the silicas was determined with the aid of a Malvern Particlesizer, Model 3600 E. This instrument, made by Malvern Instruments, Malvern, Worcestershire uses the principle of Fraunhoffer diffraction utilising a low power He/Ne laser. Before measurement the sample was dispersed ultrasonically in water for a period of 7 minutes to form an aqueous suspension.

iv) Electrolyte Levels:

Sulphate is determined gravimetrically by hot water extraction of the silica, followed by precipitation as barium sulphate. Chloride is determined by hot water extraction of the silica, followed by titration with standard silver nitrate solution using potassium chromate as indicator (Mohres method).

v) Moisture Loss at 105° C.:

Moisture loss is determined by the loss in weight of a silica when dried to constant weight in an electric oven at 105° C.

vi) Ignition Loss at 1000° C.:

Ignition loss is determined by the loss in weight of a silica when ignited in a furnace at 1000° C. to constant weight.

vii) pH:

This measurement is carried out on a 5% w/w suspension of the silica in boiled demineralised water ($C^°_2$ free).

viii) Saturated ammonium sulphate precipitation Limit:

The proteins in beer which precipitate in the presence of ammonium sulphate are considered to be the most important precursors in the development of nitrogenous haze.

Degassed beer (10 ml) is pipetted into a nephelometer tube and the latter placed in an instrument (a Unigalvo 200 obtainable from Baird and Tatlock of England) and set to zero scale reading. The sample tube is then replaced with the standard cloud tube and a scale reading of 100 obtained using the sensitivity control. 0.4 ml aliquots of saturated ammonium sulphate are then added to the beer sample and the nephelometer reading taken. The volume of solution required to give a reading of 3 is noted; this is quoted as the SASPL value (mls) for the sample.

The absorption ability of silicas and other clarifying agents can be quantified by this method because a silica treated beer will give a higher SASPL value than the control beer sample. Silica (1 g) is contacted with the test beer (1 liter) at 0° C. for 5 minutes; the beer is filtered before testing. The absorption ability can thus be quoted as D SASPL (mls), which is the difference between the two values.

ix) Mean pore diameter (MPD):

This parameter is related to the surface area and pore volume and, using a cylindrical pore model, is calculated for a silica product with the formula $$MPD \text{ (nm)} = \frac{\text{pore volume (cc g}^{-1}) \times 4,000}{\text{surface area (m}^2\text{g}^{-1})}$$

x) Beer soluble iron:

In this test a sample of silica is contacted with untreated beer for a given period of time. The beer is filtered and tested for iron content. The difference between the iron content of filtered untreated beer and that of treated beer is back calculated to give the beer soluble iron content of the silica.

A 5 g sample of the silica under test is weighed out and added to 200 ml of decarbonated beer at 24°±2° C. in a 1 liter Erlenmeyer flask. The contents of the flask are shaken immediately and then at one minute intervals for 5 minutes. After 5 minutes 50 seconds of contact the contents are again shaken and immediately filtered using an iron free filter paper. The filtrate collected over the first 30 seconds is discarded and the filtrate collected during the following 2 minutes 30 seconds is taken as the test filtrate.

The filtrate is tested for iron content using a "Fe Aquaquant" test kit, 0.01–0.2 ppm, Art 14403 manufactured by E. Merck, Darmstadt, W. Germany.

A sample of beer filtered through a similar paper to that used for the treated sample is also tested for iron content by the same method.

The result is reported as ppm Beer Soluble Iron = (Concentration of iron in treated beer −

Concentration of iron in control beer) × 40.

xi) Total iron:

Silica is first removed from the sample as silica tetrafluoride, using hydrofluoric acid.

The residue is dissolved in dilute nitric acid and the total iron is determined by atomic absorption spectroscopy using standard solutions.

xii) Mercury intrusion volume:

Mercury intrusion volumes are determined (in cc/g) by standard mercury intrusion procedures using a Micromeritics Autopore 9220 mercury porosimeter. The pore radius is calculated from the Washburn equation using values of surface tension for mercury of 485 dynes/cm and contact angle of 140°.

Prior to measurement the sample was outgassed at room temperature to a pressure of 50 microns of mercury. The mercury intrusion volume recorded is that occurring over the range of calculated pore diameters of less than 1.0 micron.

SPECIFIC DESCRIPTION OF THE INVENTION

Examples of the preparation of precipitated amorphous silicas will now be given to illustrate but not limit the invention.

A heated stirred reaction vessel was used for the silicate/acid reaction.

The solutions used in the process were:

i) Sodium silicate solutions having a $SiO_2:Na_2O$ ratio in the range of 3.2 to 3.4:1.
A sulfuric acid solution of specific gravity 1.11 (16.1% w/w solution) to 1.15 (21.4% w/w solution).
iii) An electrolyte solution as defined in each example.

The following procedure was adopted in the preparation of the precipitated silicas. Values of reactant concentrations and volumes, and reaction temperatures are given in Table I.

(A) liters of water were placed in the vessel together with (B) liters of electrolyte solution and (C) liters of the sodium silicate solution. This mixture was then stirred and heated to (E)°C.

The sodium silicate (D) liters and sulfuric acid (F) liters) solutions were then added simultaneously over a period of about 20 minutes with stirring while maintaining the temperature at (E)°C. The flow rates of the silicate and acid solutions were uniform throughout the addition period to ensure than a constant pH was maintained in the vessel. Sulfuric acid solution was then added over a period of 10 minutes with continued mixing to reduce the pH of the liquid to the range of 2.0 to 7.0, preferably to 4.5. During this addition of acid the temperature was maintained.

Optionally, at least 0.02% (w/w on $SiO_2$) of a selected complexing agent can be added at this point, if a silica with low (<20 ppm) beer soluble iron is required. The agent was added to the slurry (pH 2 to 7) and allowed to mix for at least 10 minutes, preferably 20 minutes. This complexing agent treatment was carried out on examples as shown in the Tables.

The iron complexing step can alternatively be performed by treating the dried silica with the solution of complexing agent. It has been found that the characteristics of the complexing agent do not have to be as stringent as for the process treatment previously described. As a consequence NTA will function satisfactorily on dried products.

The resultant slurry was then filtered and washed with water to remove excess electrolyte and the water soluble iron complex when present. Typically, for a beer stabilisation application, the residual electrolyte would be less than 1% on a dry weight basis. However it is not essential to have such a low value for a silica to have a good performance in the application; this is illustrated in Example 6.

After washing, the filter cake was flash dried and comminuted to the desired particle size range.

The precipitated silica obtained had the properties, expressed on a dry weight basis, as listed in Table II.

TABLE I

| EXAAMPLE NO. | 1 | 2 | 3 | 4 | 5 | 6 | 7 |
| --- | --- | --- | --- | --- | --- | --- | --- |
| Vessel Capactity (Liters) | 64 | 325 | 64 | 325 | 64 | 64 | 64 |
| Water Volumn (A) (Liters) | 22.1 | 114.5 | 21.3 | 116 | 22.5 | 23.3 | 21.9 |
| Electrolyte Used | NaCl | NaCl | NaCl | NaCl | NaCl | KCl | NaCl |
| Concentration of Electrolyte (% w/w) | 25 | 25 | 25 | 25 | 25 | 15.3 | 25 |
| Volume of Electrolyte (B) (Liters) | 2.2 | 8.7 | 3.3 | 9.0 | 2.3 | 1.3 | 1.7 |
| Silicate Ratio $SiO_2:Na_2O$ by Weight | 3.27 | 3.30 | 3.23 | 3.35 | 3.30 | 3.31 | 3.25 |
| $SiO_2$ Concentration in Sodium Silicate (% w/w) | 16.8 | 16.3 | 16.2 | 16.6 | 16.8 | 17.2 | 16.5 |
| Silicate Volume (C) (Liters) | 0.2 | 1.0 | 0.1 | 1.0 | 0.2 | 0.2 | 0.2 |
| Silicate Volume (D) (Liters) | 21.9 | 105.5 | 20.7 | | 19.6 | 19.3 | 20 |
| Acid Concnetration (% w/w) | 17.4 | 18.4 | 17.5 | 17.8 | 18.6 | 17.8 | 17.5 |
| Acid Volume (F) (Liters) | 8.1 | 39.0 | 8.1 | 40.1 | 7.7 | 7.4 | 7.9 |
| Complexing agent | none | EDTA | none | EDTA | none | none | HEEDTA |

TABLE II

| EXAAMPLE NO. | 1 | 2 | 3 | 4 | 6 | 7 |
| --- | --- | --- | --- | --- | --- | --- |
| Oil Absorption (ccg$^{-1}$) | 280 | 313 | 300 | 310 | 265 | 290 |
| Mercury Pore Volume (<1 micron ccg $^{-1}$) | 1.62 | 185 | 1.7 | 2.2 | 1.6 | 1.7 |
| Mean Pore Diameter (nm) | 9.7 | 10.9 | 8.2 | 12.1 | 9.8 | 8.4 |
| Surface Area (m$^2$g$^{-1}$) | 670 | 680 | 830 | 725 | 655 | 812 |
| Weight Mean Particle Size (Micron) | 18.6 | 19.1 | 26.7 | 19.8 | 22.3 | 23.4 |
| Ignition Loss @ 1000° C. (%) | 9.8 | 10.1 | 12.4 | 11.3 | 14 | 8.5 |
| Moisture Loss @ 105° C. (%) | 3.4 | 4.6 | 6.5 | 5.3 | 8.3 | 2.8 |
| Total Fe (ppm) | 355 | 205 | 350 | 222 | 307 | 281 |
| Beer Soluble Fe (ppm) | >80 | 8 | >80 | 4 | >80 | 16 |
| Electrolyte Level (SO$_2$) (% w/w) | 0.80 | 0.33 | 0.12 | 0.34 | 5.0 | 0.25 |
| Electrolyte Level (Cl$_4^-$) (% w/w) | 0.10 | 0.15 | 0.08 | 0.18 | 0.39 | 0.12 |
| pH | 6.0 | 6.5 | 6.0 | 6.3 | 4.0 | 5.8 |
| D SASPL (mls) | 1.5 | 1.3 | 1.5 | 1.2 | 1.3 | 1.2 |
| Bound water (%) | 6.4 | 5.5 | 5.9 | 6.0 | 5.7 | 5.7 |

Comparison: A commercially available xerogel described in UK 981715 (Braurie Industrie) with an average particle size of 18 microns gave a D SASPL value of 0.9 mls. Bound water is the difference between the ignition loss at 1000° C. and the moisture loss at 105° C.

We claim:

1. A process for treating beer or other alcoholic fermented beverage to stabilize the beverage and reduce haze on storage which comprises contacting said beer or other beverage with a precipitated amorphous silica having i) a pore volume in the range from about 1.6 to about 2.5 cc g$^{-1}$, ii) a mean pore diameter in the range from about 8.0 nm to about 20.0 nm, iii) a surface area from at least about 655–830 m$^2$g$^{-1}$, iv) an oil absorption in the range from about 250 to about 350 cc/100 g, v) a structural bound water content of at least 5% w/w as determined by the difference between the ignition loss at 1000° C. and the moisture loss at 105° C., vi) a free moisture content of less than about 25% w/w as determined by drying at 105° C., vii) an average particle size of about 5 to 30 microns, viii) less than about 20 ppm of beer solution iron which represents less than about 30% of the total iron present, ix) a D SASPL value of about 1.2–1.5 mls.

* * * * *